April 30, 1957 B. FATA 2,790,472
MACHINE FOR MAKING TAPERED DOVE-TAILS
Filed Sept. 24, 1954 7 Sheets-Sheet 1
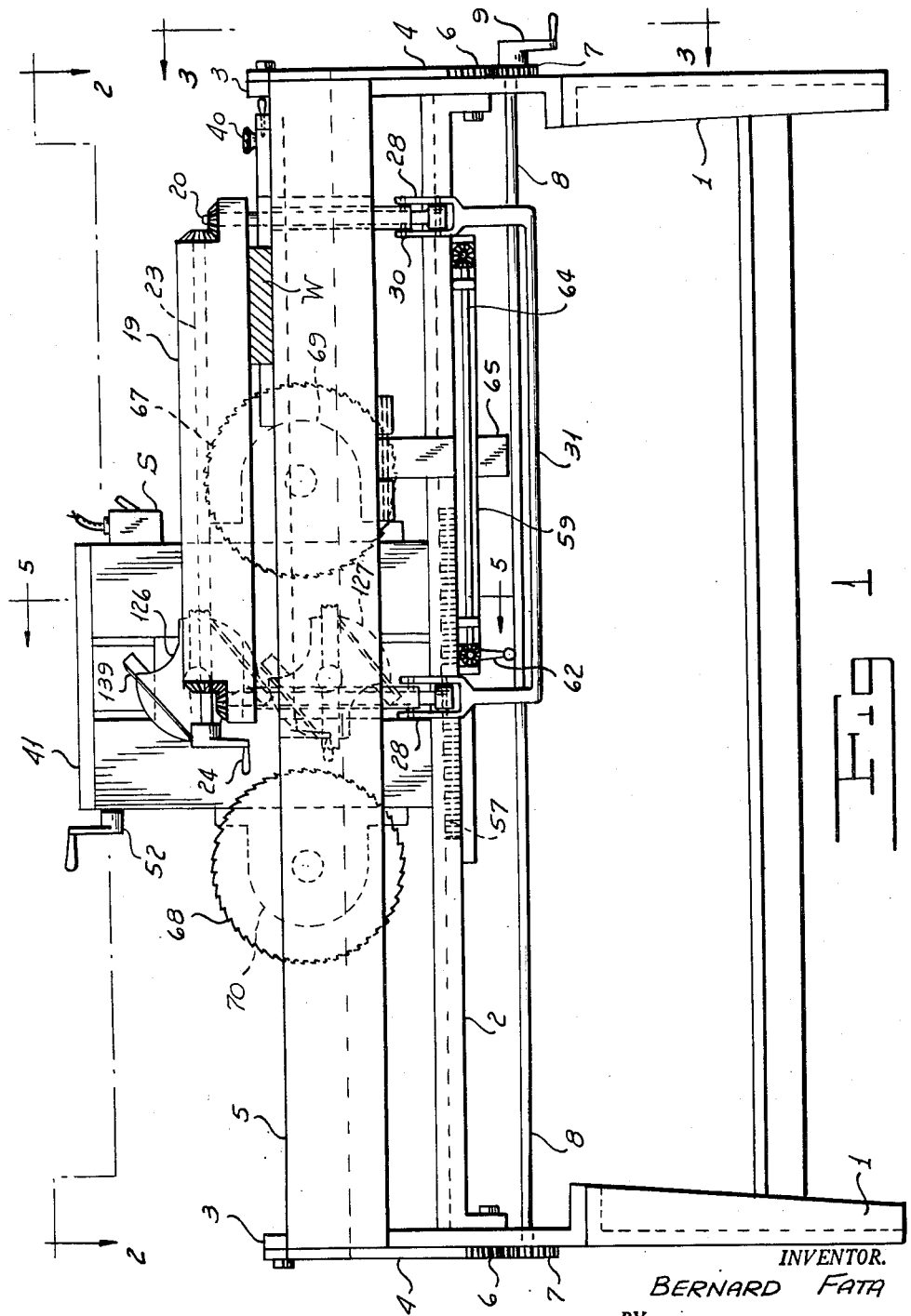
INVENTOR.
BERNARD FATA
BY
Cornelius Zabriskie
ATTORNEY

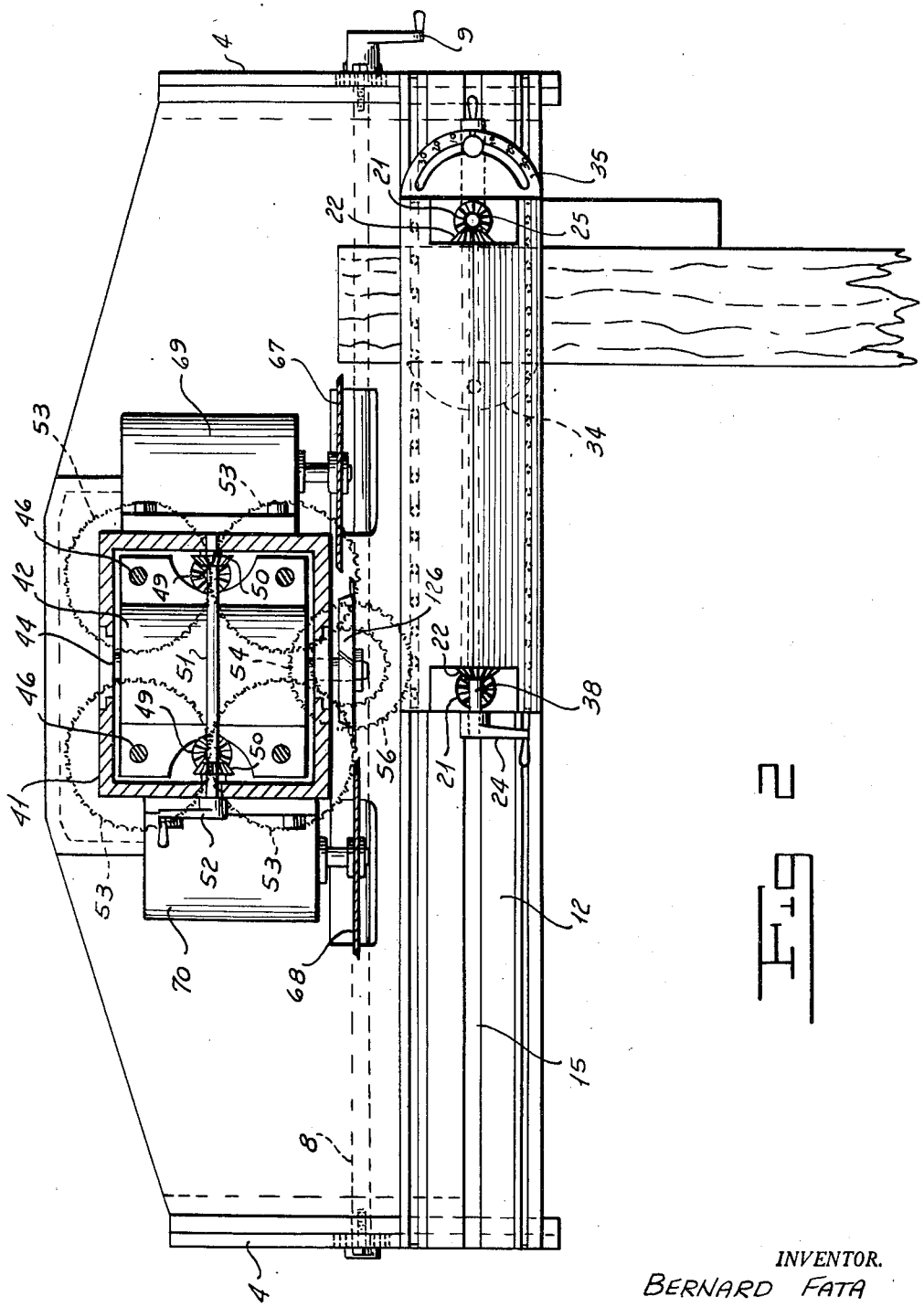

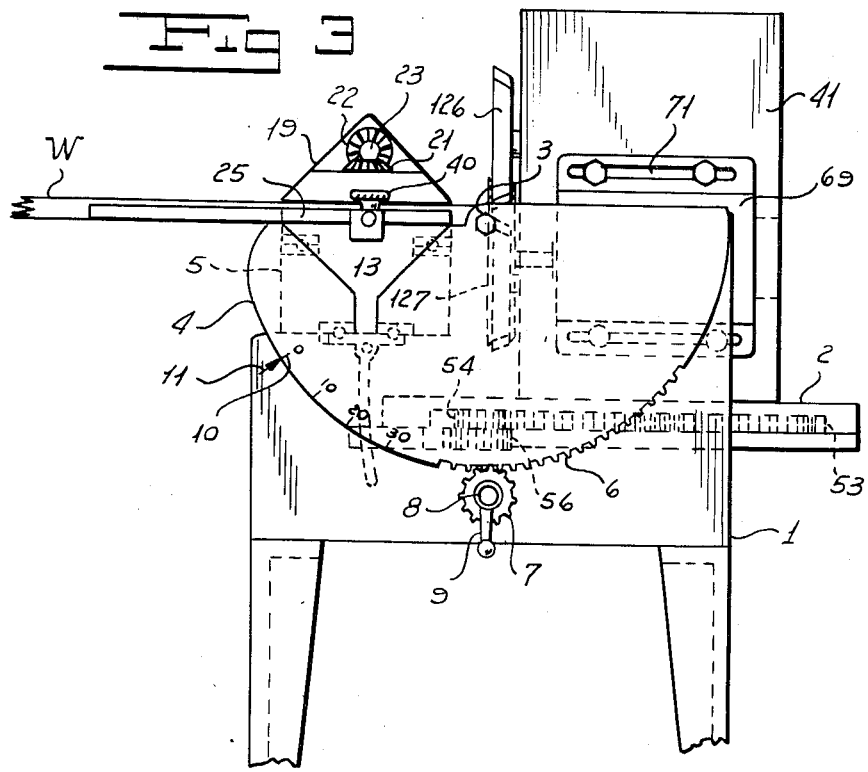

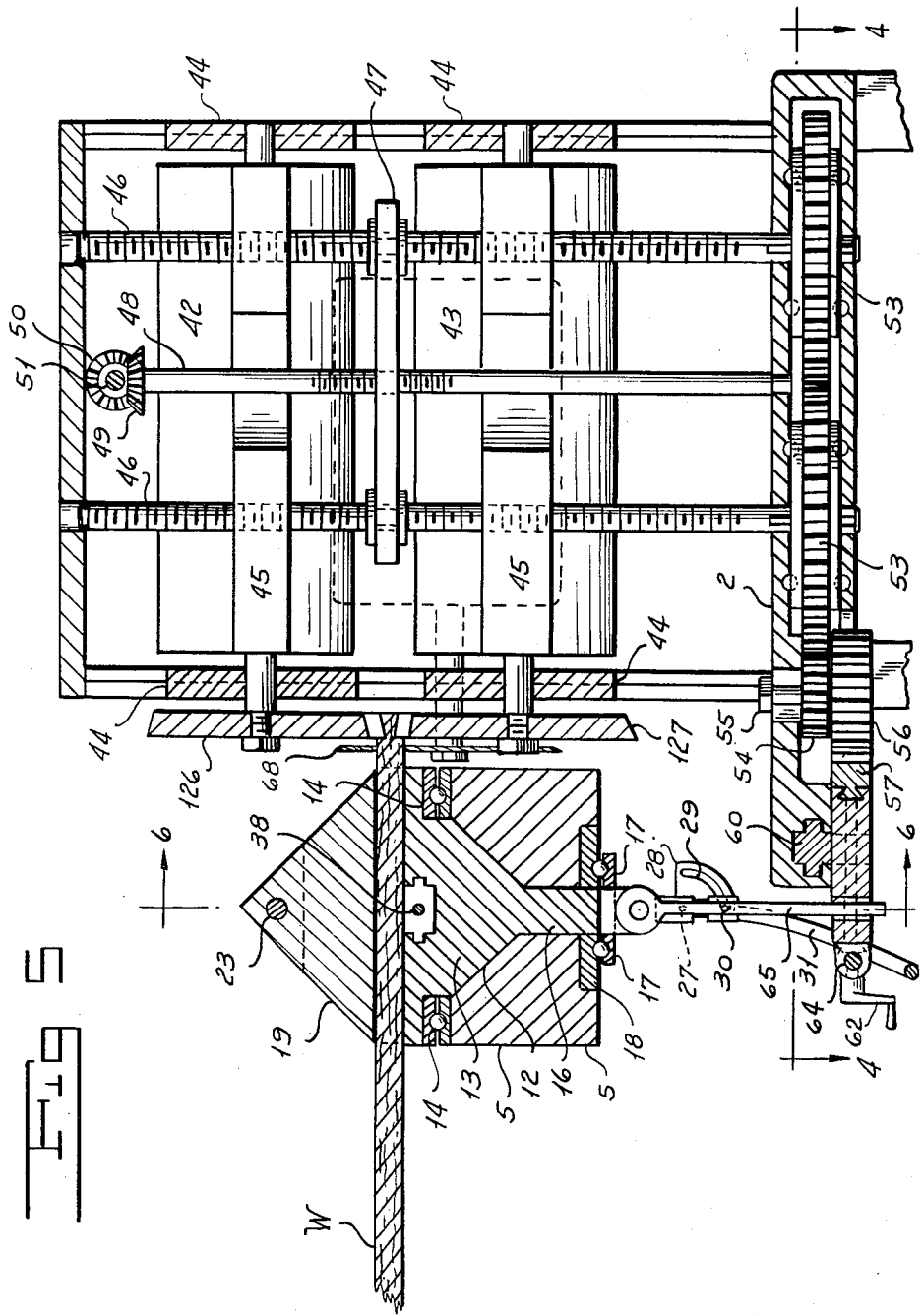

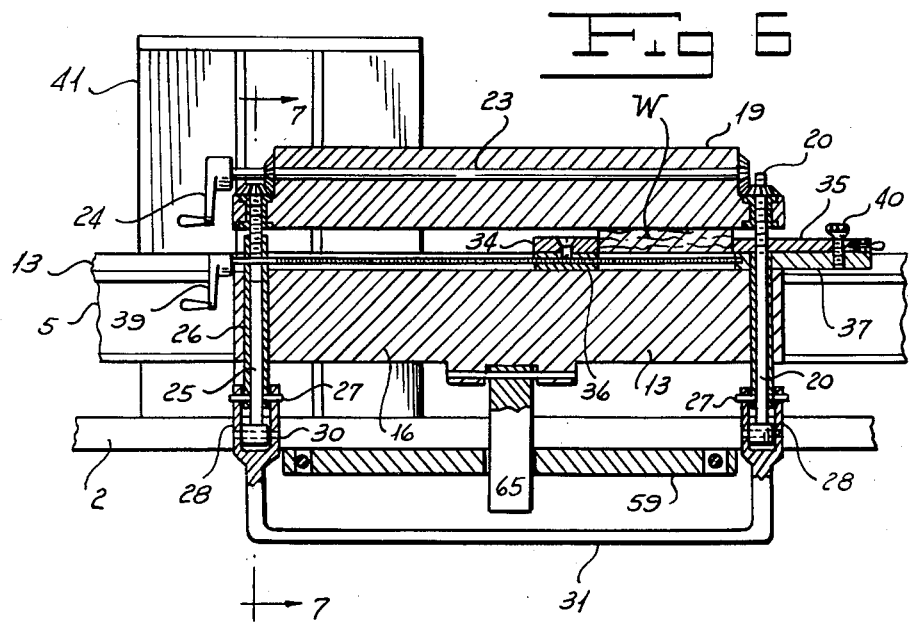
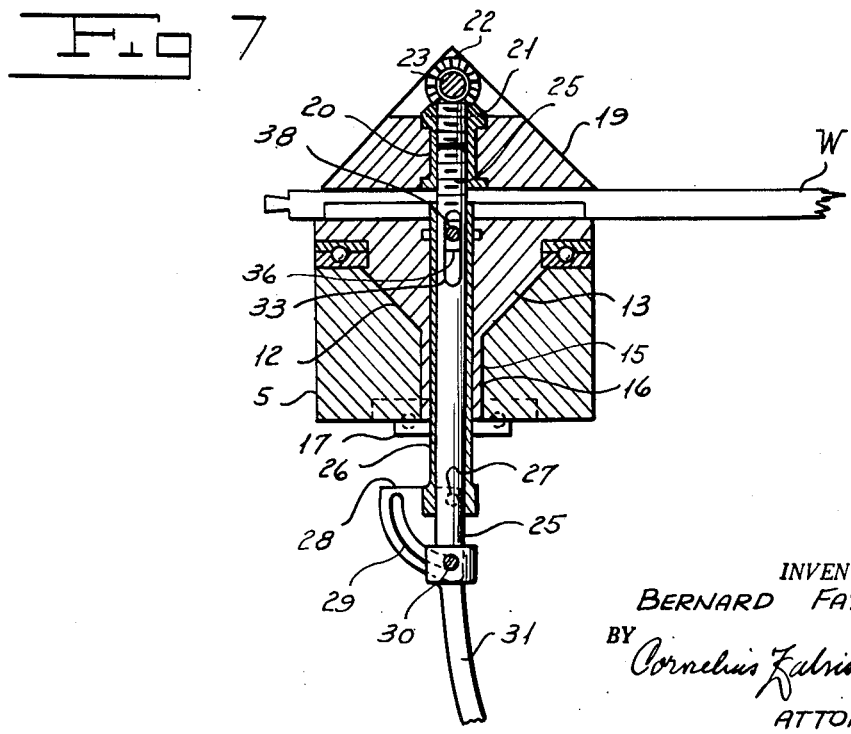

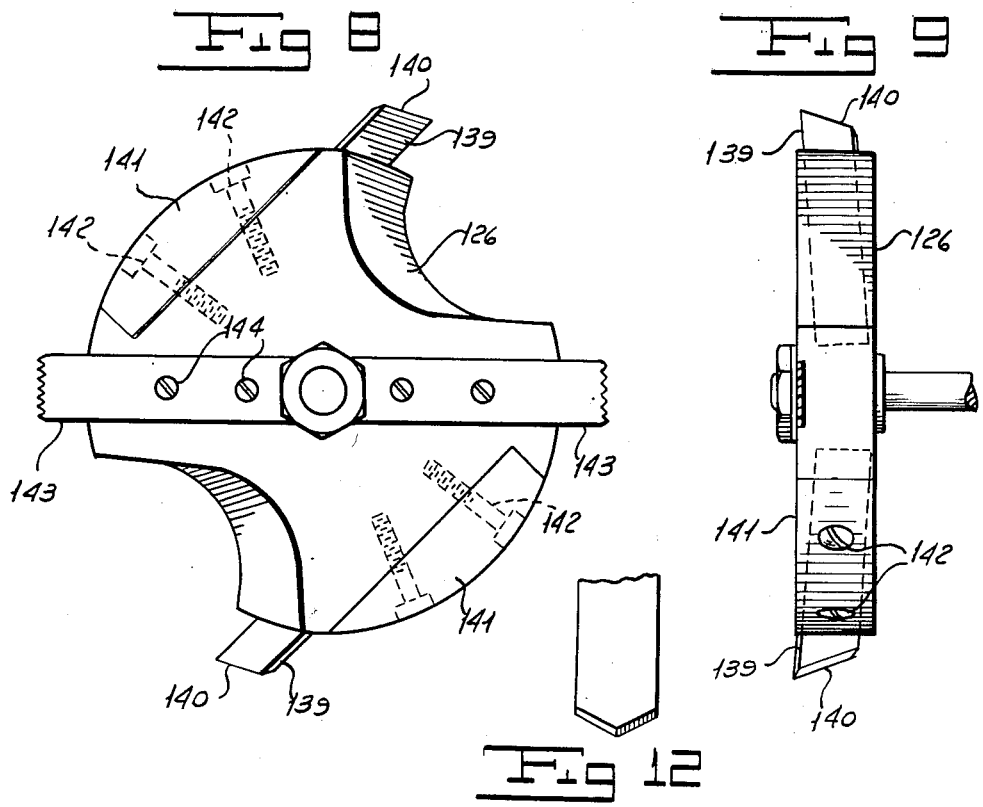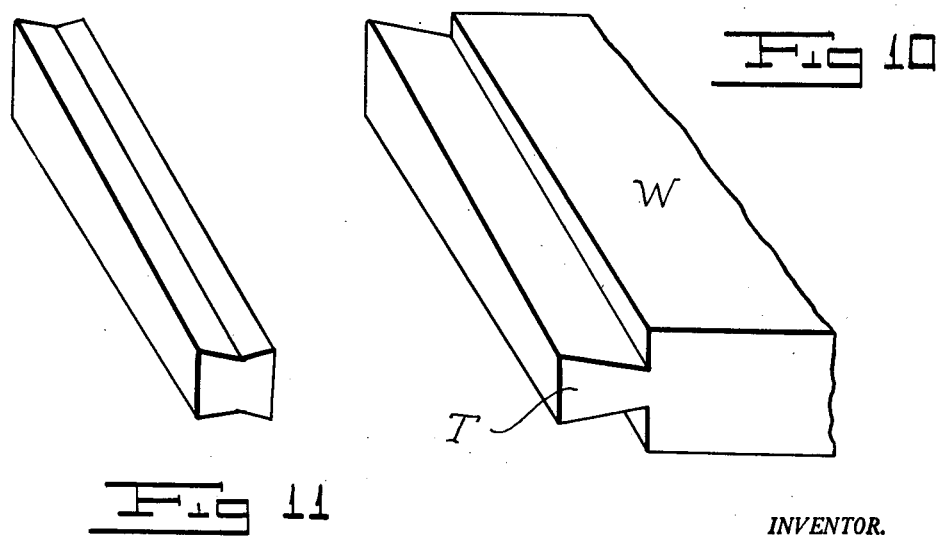

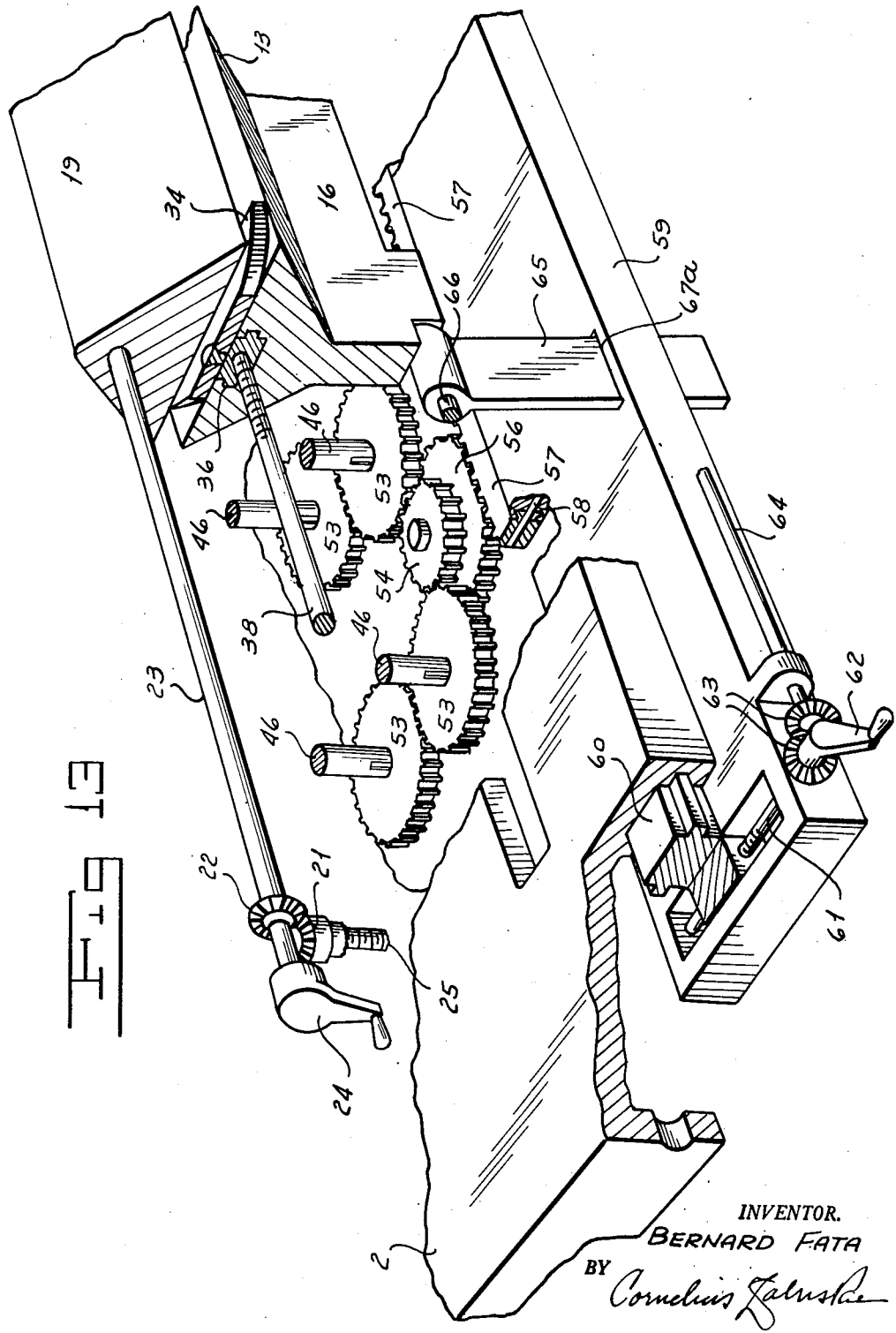

United States Patent Office 2,790,472
Patented Apr. 30, 1957

2,790,472

MACHINE FOR MAKING TAPERED DOVE-TAILS

Bernard Fata, Bronx, N. Y.

Application September 24, 1954, Serial No. 458,133

15 Claims. (Cl. 144—86)

This invention is a machine for making tapered dove-tails adapted to form one of the elements of the dove-tail joint and the object of the invention is to produce a machine of relatively simple construction adapted to rapidly cut dove-tails in an absolutely accurate manner and at a predetermined taper which may be regulated within wide limits according to the desire of the operator.

Speaking generally, the machine of this invention embodies relatively stationary, motor driven cutters adjustable to form dove-tails of different thicknesses upon a work piece mounted for movement between the cutters over a stationary work guide and on which the work piece may be held at any appropriate angle with respect to the cutters, for the work guide is tiltable to various angles, so that the dove-tail may be cut at an angle to the longitudinal medial line of the work piece. The work piece is clamped in position in a holder which is geared to the motor driven cutters in such manner that, as the work moves longitudinally of the work guide, the distance between the cutters is varied to produce a dove-tail of the desired taper. The gearing thus provided includes a gear which may be changed to provide different tapers.

The machine of this invention is adapted to cut a tapered single dove-tail tenon, i. e., one wherein the dove-tail is formed along only one edge of the work piece, or a duplex dove-tail tenon, i. e., a key which is dove-tailed along both of its opposite edges, and cut-off saws are provided for use for either purpose.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a front elevation of a machine embodying the present invention.

Fig. 2 is a horizontal section on the line 2—2 of Fig. 1.

Fig. 3 is an end elevation, taken from the plane of the line 3—3 of Fig. 1.

Fig. 4 is a fragmental horizontal section on the line 4—4 of Fig. 5.

Fig. 5 is a vertical section on the line 5—5 of Fig. 1.

Fig. 6 is a fragmental section taken on the line 6—6 of Fig. 5.

Fig. 7 is a section on the line 7—7 of Fig. 6.

Fig. 8 is a side elevation of one of the cutter heads.

Fig. 9 is an edge view of the cutter heads shown in Fig. 8.

Fig. 10 shows a dove-tail, such as made by the construction of the preceding figures.

Fig. 11 shows a duplex dove-tail key which may be manufactured by the same machine, but utilizing a compound cutter.

Fig. 12 shows one of the compound cutters.

Fig. 13 is a fragmental perspective view showing the gear train and the manner in which it is driven from the rack to adjust cutters toward and away from one another, as the work piece is moved across the table.

Referring to the drawings, 1 designates end frames on which are supported a horizontal bed 2. These frames are provided with upright bearing lugs 3 to which are pivoted semi-circular plates 4, the forward portions of which carry a work guide 5. Each of the semi-circular plates 4 is provided with gear teeth 6 which mesh with pinions 7 supported on a shaft 8 having a crank 9 (see Figs. 1 and 3). Rotation of the crank 9 will cause the work guide 5 to be tilted, as may be desired by the operator, and the determination of the angle of tilting is facilitated by a scale 10 on one of the plates 4, coacting with a pointer 11 on the corresponding end of the frame.

The work guide 5 is rigid at its opposite ends with the plates 4, so as to be tiltable therewith and is provided at its upper side with a V-shaped channel 12 (Figs. 5 and 7), in which a work holder 13 is mounted for longitudinal sliding movement. Anti-friction bearings 14 are interposed between these parts, so that this sliding movement may be easily performed without undue friction.

The work guide is provided at the base of the V-shaped channel with a longitudinal slot 15 and the work holder has a depending fin 16 operable in said slot. On the depending fin 16 below the lower edge of the work guide is fixed ball races 17 (Figs. 5 and 7) in which are mounted anti-friction bearings cooperating with ball races 18 formed in a plate affixed to the under side of the work guide for the purpose of keeping the work holder 13 seated in the V-shaped channel of the work guide.

The work piece is adapted to be clamped to the work holder 13 by a clamping head 19. This head is provided near its opposite ends with rotable bushings 20 (Figs. 6 and 7), the upper end of each of which is in the form of a bevel gear 21. These bevel gears mesh with companion gears 22 supported on a shaft 23 which extends longitudinally of the clamping head and is provided at one end with a crank 24 by which both bevel gears may be simultaneously rotated to rotate the bushings 20. The bushings 20 are hollow and are internally threaded to cooperate with the threaded ends of upright rods 25. These rods extend downwardly through sleeves 26 which are rigid with the work piece holder 13. Each of the sleeves 26 carries at its lower end a pivot 27 on which is pivotally mounted a quadrant 28 provided with arcuate slots 29 into which a pin 30 carried by the rod 25 projects. The quadrants 28 are rigid with an operating handle 31 and the slots 29 are eccentric with respect to the pivots 27 so that, when the handle 31 is rotated about these pivots, the rods 25 will be raised and lowered to clamp or release the work piece W. Each of the rods 25 is locked against rotation by the shaft 38 which extends through a slot 33 in said rod.

The purpose of the gears 21 and 22 is to adjust the space between the work clamp 19 and the work holder to work pieces of different thicknesses and after such adjustment has been made by rotation of the crank 24, the work may be tightly clamped by operation of the handle 31 and through the conjoint action of the eccentric slots 29 upon the pins 30 (Fig. 7).

Appropriate cross cut guides 34 and 35 are pivotally secured to slide blocks 36 and 37, mounted in the upper surface of the work holder 13 (Figs. 2, 6 and 13). The slide block 36 is provided therein with a threaded passage and a threaded rod 38 extends through this passage and has at one end a crank 39 through rotation of which the cross cut guides 34 and 35 may be caused to clamp the work piece W between them. These cross cut guides may be pivotally adjusted to any desired angle as may be required by the work to be performed and may be locked in this position by means of a thumb screw 40.

The bed 2 is rigidly supported at its opposite ends on the end frames 1 of the machine and mounted in fixed position on this bed is an upright cutter stock in the form of a hollow box-like housing 41. Within this housing are positioned two superimposed electric motors 42 and 43. The armature shaft of each motor extends beyond both ends of the motor housing and the protruding ends are passed through guide blocks 44 positioned in upright slots at the front and back of the housing and having tongue and groove connection therewith, so that the motors may be bodily raised and lowered while guided for vertical movement by the guide blocks 34. The forward end of the armature shaft of the motor 42 carries a cutter head 126, while the corresponding end of the armature shaft of the motor 43 carries a cutter head 127. These heads may be moved toward and away from one another by regulating the vertical spacing of the motors 42 and 43. To provide for this vertical adjustment, each of the motors has at its opposite sides a motor mounting bracket 45 and these brackets have threaded connection with upright rods or worms 46.

The several upright threaded rods 46 all pass through a plate 47 with collars above the plates, so that vertical movement of the plate in either an upward or downward direction would correspondingly shift these rods. Two threaded shafts 48 extend through the plate 47 and have threaded connections therewith. The upper ends of these shafts carry bevel pinions 49 meshing with bevel gears 50 on a shaft 51 provided with a crank 52 (Fig. 2) through the rotation of which the plate 47 may be raised and lowered with consequent movement of the several right threaded rods 46. The purpose of this movement is to adjust the cutters 126 and 127 simultaneously to different elevations according to the thickness of the work piece, so that the dove-tail to be formed upon the latter may be centrally located according to the requirements of the particular job and also according to the thickness of the work piece.

The threaded rods 46 constitute in effect four worms with the upper and lower portion of each worm threaded in opposite directions, so that the rotation of the worms in unison will cause the upper and lower motors to be moved toward or away from one another. The worms are connected to one another at their lower ends by the gear train shown in Figs. 4 and 13. More specifically, the lower end of each worm has a splined connection with an individual gear 53. Each pair of such gears mesh with one another as shown in Figs. 4 and 13 and one gear of each of said pairs meshes with a common idler 54. This idler 54 is supported for rotation on a removable stub shaft 55 and when the idler is driven, it will serve to simultaneously rotate all four worms and bring about adjustment of the cutters in the manner described.

Detachably locked to the idler 54 is a drive gear 56 which meshes with a rack 57. This rack is detachably mounted by means of dove-tail spline connection and pins 58 or in any other suitable manner on the rear edge of a rack holder 59. This rack holder has a tongue and groove connection 60 with the underside of the forward edge of the bed 2, as shown best in Fig. 13, so that the rack holder is mounted for sliding movement longitudinally of the bed. The rack holder 59 may be adjusted to and from the bed in order to insure proper cooperation between the rack 57 and the drive gear 56, by means of threaded shafts 61, one of which is operated by a crank 62 and connected to a corresponding mounting at the other end of the rack holder by means of bevel gears 63 and a shaft 64.

Longitudinal movement is imparted to the rack holder by means of a propelling finger 65. This finger is pivotally supported on a pin 66 mounted on the lower edge of the fin 16 of the work holder and said finger projects downwardly through a slot 67a in the rack holder 59 as seen best in Fig. 13, so that, when the work holder, with the work clamped thereon, is moved past the cutters, the rack holder 59 will have like travel and in so doing will longitudinally move the rack 57 to operate the gear train shown in this figure.

The purpose of this interlocking of the parts for conjoint movement is to produce a tapered dove-tail, as hereinafter more fully explained, but it may be here noted that the drive gear 56 is demountable so that different sizes of drive gear may be utilized depending upon the amount or degree of taper desired in the dove-tail. The rack 57 may be changed according to the particular work to be performed. The adjustment provided by the threaded shafts 61 permits of the use of drive gears of different radii while maintaining proper meshing cooperation between such gears and the rack 57.

The cutter heads used in the machine of this invention are preferably as shown in Figs. 8 and 9 which serve to produce on the work piece W a tapered tenon T, such as shown in Fig. 10. The cutter head 126 is provided with face cutting blades 139 and also with shoulder cutting blades 143. The face cutting blades 139 have oblique cutting edges 140 after the manner of a skew chisel, while each of such blades is mounted in oblique relation with respect to the face of the cutter head. With this mounting, these cutter blades not only shape one face of the dove-tail at a predetermined proper angle, but also have an acute angle of approach to the work, so that the cut is progressive in a direction longitudinally of the cutting edges. By this arrangement, a much cleaner shearing cut is obtained than would be the case if the blades were arranged with their cutting edges in planes parallel to the axis of the armature shaft on which the cutter head is mounted. The face cutting blades are secured to the body by means of clamping blocks 141 held in place by screws 142.

Figs. 8 and 9 illustrate the details of the cutting head 126, but it will be understood that on the cooperating cutting head 127, the cutter blades are arranged at angles opposite to those shown for the cutting head of these figures.

The shoulder cutting blades 143 are mounted flush with the outer face of the cutter heads and are held in place by screws 44. The cutting edges of these blades are preferably serrated or saw-toothed as shown. With this arrangement, each shoulder cutter 143 forms a cut at the shoulder in advance of the following face cutter 139, which then cuts to the depth of the cut previously made by said shoulder cutter. This operation proceeds as the work is fed past the cutter head so that a nice clean and accurate shoulder is formed at each side of the tenon and splitting or splintering at the shoulders is avoided even when the work is fed at good production speeds.

The machine of this invention is capable, not only of making dove-tails at the end of a work piece as shown in Fig. 10, but may be also utilized to cut duplex dove-tail keys, such as shown in Fig. 11 by utilizing compound cutters, such as shown in Fig. 12. When the duplex key of Fig. 11 is cut, the operation is preferably carried out while the stock from which the key is made forms part of the end of a work piece, the key being subsequently severed from the work piece. This severing of the key, as well as trimming of the free end of the work piece, prior to the cutting of a dove-tail at such end is adapted to be carried out by means of circular saws 67 and 68. These saws are individually driven by motors 69 and 70, respectively, mounted at the opposite sides of the housing or stock 41, as shown best in Figs. 2 and 3 and these motors are made adjustable in the direction longitudinally of their armatures by the bolt and slot connection 71 shown in the latter figure.

*Operation*

If it be assumed that the machine is to be operated to make a tapered dove-tail, such as shown in Fig. 10, the work guide 5 is first positioned, by operation of the crank 9, so that the upper surface of the work piece holder 13 will be horizontal. The work piece W is then placed on the work piece holder 13 beneath the clamping head 19 and the cross cut guides 34 and 35 are so adjusted that their work piece contacting edges will be normal to the edges of the work holder 13. The crank 39 (Fig. 6) is then manipulated to clamp the work piece between the cross cut guides with the inner end of the work piece preferably slightly overlapping the circular saw 67.

When the piece is thus positioned, it is next clamped by the clamping head 19 which is first manipulated into substantially gripping position by manipulating the crank 24. When the head is in this preadjusted position, it is moved into final gripping or clamping position by pulling forwardly the handle 31 which draws the head down tightly through the eccentric connections described. The circular saw 67 should be adjusted, so that it will cut off the unfinished end of the work piece at which the dovetail is formed, while the saw 68 should be retracted entirely out of the path of the work piece.

Having thus made all the necessary adjustments and clamp the work piece in position to be operated upon, current is fed to the motors 42, 43 and 69 through the switch S. The work piece holder 13 is then moved to the left in Figs. 1 and 2, so that the circular saw 67 first trims the end of the work piece and the trimmed end is thereupon passed between the cutter heads 126 and 127 to cut the tenon. As the work piece is fed in the manner described, the rack 57 is moved to the left and rotates the driving gear 56 which imparts rotation through the idler 54 to the gears 53 and, as a result thereof, the worms 46 are rotated to cause the spacing between the cutters to be progressively decreased as the end of the work piece moves between said cutters, in order to obtain the longitudinal taper on the tenon exhibited in Fig. 10.

After the work piece has been moved between and beyond the cutters, the dove-tail is complete, the work piece holder 13 is brought to rest and the handle 31 is operated to release the work piece. The clamping action of the cross cut guides is then relieved and the work piece is removed from the machine in finished condition.

In the event that a duplex key, such as shown in Fig. 11, is to be made, the work piece is clamped as before, but instead of using the cutters 139, compound cutters, such as shown in Fig. 12, are employed, and the circular saw 68 is moved into position to cut the resulting key from the work piece after it has been formed thereon. When making the key of Fig. 11, the shoulder cutters 143 are omitted.

In either case, the operation on the next work piece is carried out in the same manner as described, after the work piece holder 13 has been withdrawn to the right hand side of the cutters, i. e., into its initial or starting position.

The machine of this invention operates with high efficiency to produce dove-tails of accurate shape and taper and to accomplish this result in a simple and expeditious manner.

The foregoing detailed description sets forth the invention in its preferred practical forms, but the invention is to be understood as fully commensurate with the appended claims.

Having thus fully described the invention, what I claim as new and desire to secure by Letters Patent is:

1. A machine for making dove-tails comprising a work holder adapted to support a work piece for rectilinear movement along a predetermined path, a pair of cutter heads positioned in the path of the work piece and operable against the opposite faces of said work piece to collectively cut a tenon thereon, an electric motor having a driven shaft supporting each cutter head, worms having threaded connection with said motors and adapted when rotated to vary the distance between the motors and correspondingly vary the distance between the cutter heads, and gearing connecting said worms and work holder for synchronizing the movements of the motors with the travel of the work holder.

2. A machine according to claim 1, wherein the worms are geared to one another for conjoint rotation, and a rack rectilinearly movable with the work holder for driving said gears.

3. A machine according to claim 1, comprising means for bodily axially shifting the worms to center the cutter heads with respect to the thickness of the work piece supported on the work holder.

4. A machine according to claim 1, wherein the work holder is mounted for pivotal movement on an axis parallel to its path of travel.

5. A machine according to claim 1, wherein the worms have right and left hand threaded connection with the respective motors.

6. A machine for making dove-tails comprising: a work holder adapted to support a work piece for rectilinear movement along a predetermined path, a pair of cutter heads positioned in the path of the work piece and operable against the opposite faces of the work piece to collectively cut a tenon thereon, parallel driven shafts for driving said cutter heads, and worm and gear connections between said shafts and the work holder for varying the distance between the shafts in synchronism with the rectilinear movement of the work holder.

7. A machine according to claim 6, comprising means for clamping the work piece firmly to the work holder against inadvertent movement relative to the latter during the cutting of the tenon.

8. A machine according to claim 6, comprising a clamping head for clamping the work piece to the work holder, tie rods for adjusting the clamping head to the thickness of the work piece, and eccentric means for drawing the clamping head tightly against the work piece.

9. A machine according to claim 6, comprising cross cut guides mounted on the work holder for relative adjustment thereon, and means for forcing said guides into gripping relation with the lateral edges of a work piece supported on said holder.

10. A machine for cutting tenons comprising: end frames, a bed mounted between said end frames, a work guide mounted above the bed and supported at its opposite ends on said end frames, a work holder mounted for sliding movement longitudinally of said guide along a predetermined path of travel with means for clamping a work piece to the work holder, in combination with a housing mounted on the bed, a pair of parallel motor driven shafts supported on the housing, a cutter head mounted on one end of each of said shafts and positioned in the path of travel of the work piece, worms supported on the housing and connected to said shafts and adapted when rotated to move the shafts toward and away from one another to vary the distance between the cutter heads, gearing for rotating all of said worms in unison, and driving connections between said gears and the work holder to synchronize the variation in spacing of the cutter heads with the movement of the work holder.

11. A machine according to claim 10, wherein the gearing connections include a rack movable with the work holder and meshing with the gearing which connects the worms.

12. A machine according to claim 10, comprising: means for axially shifting the worms to adjust the cutters to work pieces of different thickness.

13. A machine according to claim 10, comprising: a motor driven circular saw positioned along the path of travel of the work piece in advance of the cutters for trimming the end of the work piece prior to the formation of the tenon thereon.

14. A machine according to claim 10, comprising: a motor driven circular saw for cutting the tenon from the work piece after the tenon has been cut.

15. A cutter head for dove-tail tenon cutting machines comprising: a supporting body adapted to be rotated about a central axis, face cutters rigidly supported on said body in skewed relation to said axis of rotation and having cutting edges oblique to the axis of the cutter head, and a shoulder cutter mounted on the supporting body in a plane normal to said axis and provided with serrated cutting edges and arcuately spaced from the face cutters.

References Cited in the file of this patent

UNITED STATES PATENTS

| | | |
|---|---|---|
| 181,897 | Bahse | Sept. 5, 1876 |
| 1,023,296 | Brown | Apr. 16, 1912 |
| 1,087,460 | Raulf | Feb. 17, 1914 |
| 1,190,151 | Green | July 4, 1916 |
| 1,462,234 | Laughlin | July 17, 1923 |
| 1,519,753 | Bertram | Dec. 16, 1924 |
| 2,683,476 | Courcier | July 13, 1954 |
| 2,695,639 | Fata | Nov. 30, 1954 |

FOREIGN PATENTS

| | | |
|---|---|---|
| 304,676 | Germany | May 31, 1918 |